US006999615B2

(12) United States Patent
McClanahan et al.

(10) Patent No.: US 6,999,615 B2
(45) Date of Patent: Feb. 14, 2006

(54) COLOR MANAGEMENT AND SOLUTION DISTRIBUTION SYSTEM AND METHOD

(75) Inventors: Craig J. McClanahan, Bowling Green, OH (US); James Soss, Toledo, OH (US)

(73) Assignee: BASF Corporation, Southfield, MI (US)

( * ) Notice: Subject to any disclaimer, the term of this patent is extended or adjusted under 35 U.S.C. 154(b) by 881 days.

(21) Appl. No.: 09/874,700

(22) Filed: Jun. 5, 2001

(65) Prior Publication Data

US 2002/0181766 A1 Dec. 5, 2002

(51) Int. Cl.
*G06K 9/00* (2006.01)

(52) U.S. Cl. .................. 382/162; 382/167; 706/20; 706/16

(58) Field of Classification Search ............ 382/162, 382/167, 166; 700/123; 702/32, 127, 104, 702/85; 706/20, 16; 345/589
See application file for complete search history.

(56) References Cited

U.S. PATENT DOCUMENTS

| | | | |
|---|---|---|---|
| 5,386,496 A | 1/1995 | Arai et al. | |
| 5,410,637 A | 4/1995 | Kern et al. | 395/61 |
| 5,546,195 A | 8/1996 | Arai | 358/518 |
| 5,548,697 A | 8/1996 | Zortea | |
| 5,559,604 A | 9/1996 | Arai | 356/402 |
| 5,577,178 A | 11/1996 | Curry et al. | |
| 5,579,031 A | 11/1996 | Liang | 345/154 |
| 5,583,642 A | 12/1996 | Nakazono | |
| 5,680,333 A | 10/1997 | Jansson | 364/578 |
| 5,687,000 A | 11/1997 | Nakaoka | 358/296 |
| 5,729,360 A | 3/1998 | Kita et al. | 358/500 |

(Continued)

FOREIGN PATENT DOCUMENTS

| | | |
|---|---|---|
| EP | 484 564 | 11/1990 |
| EP | 0 822 396 | 2/1998 |
| EP | 0 946 051 | 9/1999 |
| GB | 1056358 | 10/1963 |
| JP | 404235322 | 8/1992 |
| WO | WO 92/05470 | 4/1992 |
| WO | WO 94/14039 | 6/1994 |
| WO | WO 98/12520 | 3/1998 |
| WO | WO 99/01982 | 1/1999 |
| WO | WO 00/65847 | 11/2000 |
| WO | PCT/US02/14023 | 12/2002 |
| WO | PCT/US02/14090 | 12/2002 |

OTHER PUBLICATIONS

BASF Corporation, et al. International Search Report PCT/US02/14091 International filing date Mar. 5, 2002.
BASF Corporation, et al. International Search Report PCT/US02/14092 International filing date Mar. 5, 2002.
Publication entitled *"Neural Network for RGB TO YMCK Color Conversion"*, by Satoshi Abe'. Gabriel Marcu, Department of Information Science, Faculty of Science, The University of Tokyo, Japan Array Corporation, Tokyo, Japan, published in Aug. 1994.
Co–pending U.S. Appl. No. 09/874,700, entitled *"Color Management and Solution Distribution System and Method"* filed Jun. 5, 2001.
Co–pending U.S. Appl. No. 09/874,699, entitled *"System and Method for Determining Acceptability of Proposed Color Solution Using an Artificial Intelligence Based Tolerance Model"* filed Jun. 5, 2001.

(Continued)

*Primary Examiner*—Kanjibhai Patel
*Assistant Examiner*—Ali Bayat

(57) ABSTRACT

A computer based system and method provides color solutions to a customer. A solution request from an operator located at a remote location is received and delivered to a central location over a computer network. A composite solution database is searched to determine a color solution as a function of the solution request.

40 Claims, 3 Drawing Sheets

U.S. PATENT DOCUMENTS

| | | |
|---|---|---|
| 5,761,070 A | 6/1998 | Conners et al. ......... 364/478.11 |
| 5,771,311 A | 6/1998 | Arai ............................ 382/162 |
| 5,774,230 A | 6/1998 | Goto ............................ 358/298 |
| 5,798,943 A | 8/1998 | Cook et al. .................. 364/526 |
| 5,864,834 A | 1/1999 | Arai ............................. 706/16 |
| 5,899,605 A | 5/1999 | Caruthers, Jr. et al. ...... 399/223 |
| 5,929,906 A | 7/1999 | Arai et al. ................... 348/223 |
| 5,943,663 A | 8/1999 | Mouradian et al. |
| 6,088,475 A | 7/2000 | Nagashima et al. ......... 382/162 |
| 6,459,425 B1 | 10/2002 | Holub et al. |
| 6,804,390 B1 | 10/2004 | McClanahan |
| 2002/0052862 A1 * | 5/2002 | Scott et al. ..................... 707/1 |
| 2002/0106121 A1 | 8/2002 | McClanahan |
| 2002/0156917 A1 * | 10/2002 | Nye ............................. 709/238 |
| 2002/0184171 A1 | 12/2002 | McClanahan |
| 2003/0110101 A1 * | 6/2003 | Friel et al. ..................... 705/28 |
| 2003/0163262 A1 * | 8/2003 | Corrigan et al. ............... 702/32 |
| 2003/0174143 A1 * | 9/2003 | Rice et al. ................... 345/589 |
| 2004/0073526 A1 | 4/2004 | McClanahan |

OTHER PUBLICATIONS

Co-pending U.S. Appl. No. 10/206,556, entitled *"Color Management and Solution Distribution System and Method"* filed Jul. 26, 2002.

Co-pending U.S. Appl. No. 10/065,705, entitled *"Electronic Display of Automotive Colors"* filed Nov. 12, 2002.

* cited by examiner

COLOR MANAGEMENT AND SOLUTION DISTRIBUTION SYSTEM AND METHOD

BACKGROUND OF THE INVENTION

1. Field of the Invention

The present invention relates generally to color matching, and more particularly, to a method and system for providing a color matching solution.

2. Description of the Related Art

Products today are offered to consumers in a wide variety of colors. Consumer products may be colored by means of colorants, dye or paint. Color matching is required in a variety of areas, including textiles, plastics, various synthetic materials, prosthetics, dental applications, and paint applications, due to the many variations in color, due to the wide variations in shades and hues of any given color and color variations in an article. The actual color produced in a given article may vary due to a number of factors. For example, textile colors vary according to fiber composition. Colorants for plastic vary according to the plastic composition. Painted articles vary in color depending on any number of factors, such as paint composition, variations in the paint application process, including application method, film thickness, drying technique and number of layers. An important application for color matching is in the area of automotive color matching. Frequent uses for color matching in automotive paint occur in matching the same color from different batches or matching similar colors from different manufacturers. Additionally, there is a requirement for color matching refinish paint to an OEM (original equipment manufacture) color when a vehicle body panels are damaged and require repainting.

A paint manufacturer supplies one or more paint formulations for the original paint color to refinish paint shops. By supplying a plurality of formulations or variants for a particular color, the paint manufacturer accounts for factors that affect the actual color. Matching of dyes or colorants for other applications is also done through formulations for a particular color. Typically, for any of the above application, the formulations for a particular color are distributed on paper, microfiche, and/or compact disks (CD). A color tool, composed of swatches of the variants for each color may also be produced and delivered to each customer. The customer must select a formulation most closely matching the existing color of the article. This is typically done visually, i.e., by comparing swatches of paint or color to the part or in the case of paint, spraying a test piece with each formulation.

Different formulations are derived from actual data gathered by inspectors at various locations, e.g., the textile, plastic or automobile manufacturer or vehicle distribution point. The inspectors take color measurement readings from articles of a particular color. These readings are used to develop color solutions, i.e., different formulations for the same color.

There are several disadvantages to the present method of color matching. Conventional color laboratories that use human analysis to determine color matching require significant numbers of people, equipment and materials for identifying pigments and locating a close match from a database. In some cases, an existing formula may provide a close match. In other cases, the formula must be adjusted, mixed, applied and compared to a standard. These steps are repeated until a suitably close match is found. In other cases, no match is found and a formula must be developed from scratch. Correction of the formula requires a highly skilled technician proficient in the interaction of light with several different pigments.

Moreover, traditional computer software that assists a technician has several disadvantages. Traditional computer software has not proven to be very effective on colors containing "effect pigments." This software is typically based on a physical model of the interaction between illuminating light and the colorant or coating. These models involve complex physics and do not account for all aspects of the phenomena. A traditional approach is to use a model based on the work of Kubleka-Munk or modifications thereof. The model is difficult to employ with data obtained from multi-angle color measuring devices. One particular difficulty is handling specular reflection that occurs near the gloss angle. Another deficiency of the Kubleka-Munk based models is that only binary or ternary pigment mixtures are used to obtain the constants of the model. Thus, the model may not properly account for the complexities of the multiple interactions prevalent in most paint recipes.

The present invention is directed to solving one or more of the problems identified above.

SUMMARY OF THE INVENTION

In one aspect of the present invention, a computer system for providing color solutions to a customer, is provided. The system includes a first module located at a remote location. The first module receives a solution request from an operator. A second module is coupled to the first module via a computer network. The second module is located at a central location and includes a composite solution database and a search routine coupled to the composite solution database. The second module is adapted to receive the solution request from the first module. The search routine is adapted to search the composite solution database and determine a paint color solution as a function of the solution request.

In another aspect of the present invention, a computer based method for providing color solutions to a customer over a computer network, is provided. The method includes the steps of receiving a solution request from an operator located at a remote location, delivering the solution request from the remote location to a central location over the computer network, and searching a composite solution database and determining a paint color solution as a function of the solution request.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE PREFERRED EMBODIMENT

1. Overview.

Referring to the FIGS., wherein like numerals indicate like or corresponding parts throughout the several views, a computer system 100 for managing and providing color solutions, such as paint, pigments or dye formulations, is provided.

Figure 1:
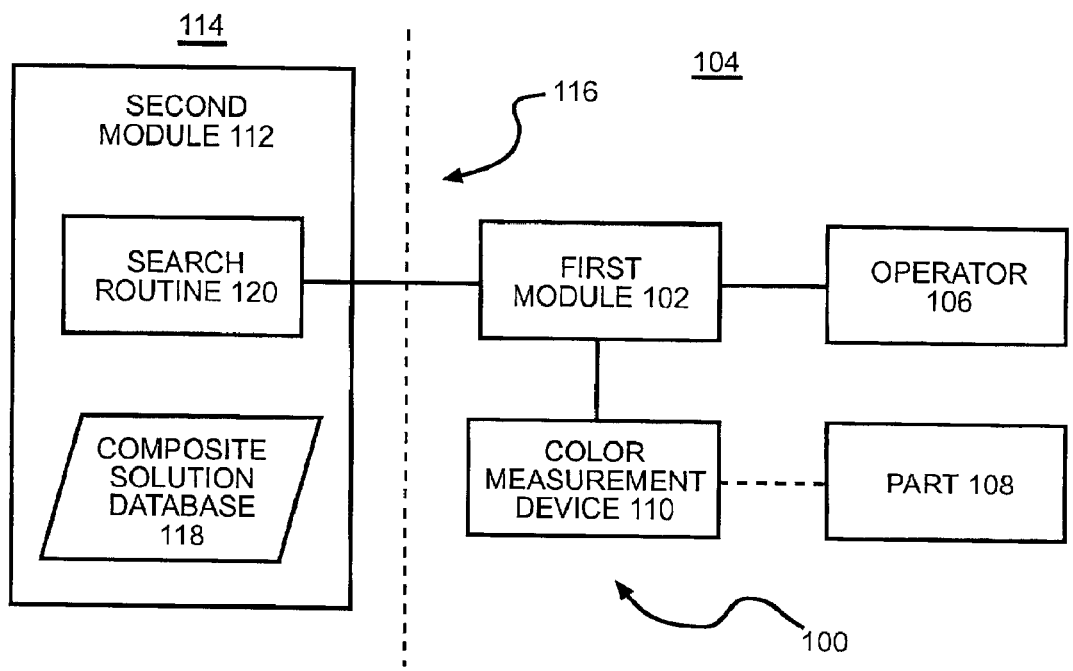
FIG. 1 is a block diagram of a color management and solution distribution system, according to an embodiment of the present invention.

With particular reference to FIG. 1, in a first embodiment, the system 100 includes a first module 102 located at a remote location 104, such as a customer site. Preferably, the first module 102 is implemented on a computer (not shown), such as a personal computer or wireless computing device. The first module 102 is adapted to be operated by a user or operator 106, i.e., the customer. The operator 106 inputs a solution request to the first module 102. The solution request includes a paint identifier (or color code) which identifies the color of a subject part 108 and color measurements from a color measurement device 110. The part may be any colored sample or a painted component.

The color measurement device 110 is used to provide color measurements, i.e., an indication of the actual color of the subject part 108 to be matched. Preferably, the color measurement device 110 is a spectrophotometer such as is available from X-Rite, Incorporated of Grandville, Mich. as model no. MA58. Alternatively, the color measurement device 110 may be a spherical geometry color measuring device, a digital camera or other suitable device.

The first module 102 is coupled to a second computer based module 112 located at a central location 114, such as the paint manufacturer's facility. The first and second computer based modules 102, 112 are coupled across a computer network 116. In the preferred embodiment, the computer network 116 is the internet.

The second module 112 receives the solution request from the operator 106 via the first module 102 and the computer network 116. The second module 112 includes a composite solution database 118 and a search engine or routine 120. The search routine 120 is adapted to search the composite solution database 118 and determine a paint color solution as a function of the solution request.

Figure 2:
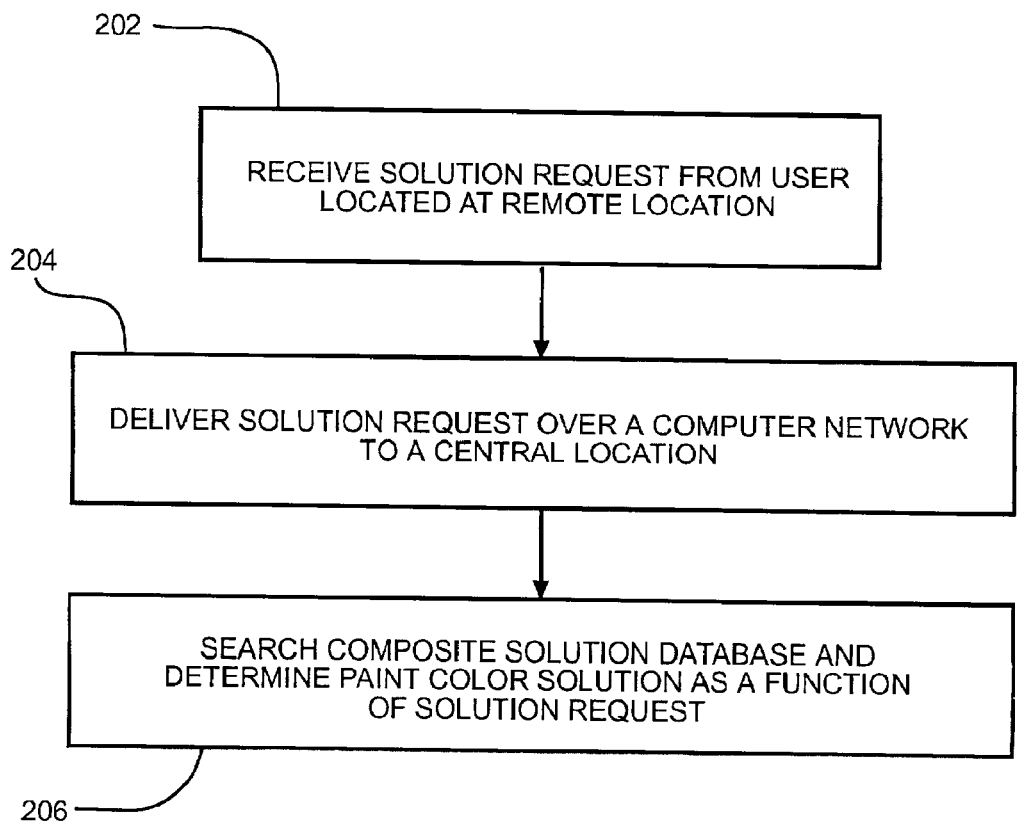
FIG. 2 is a flow diagram of a color management and solution distribution method, according to an embodiment of the present invention.

With reference to FIG. 2, a computer based method for providing paint color solutions to a customer will now be explained. In a first control block 202, the solution request from the operator 106 located at the remote location 104 is received. In a second control block 204, the solution request is delivered over the computer network 116 from the remote location 104 to the central location 104. In a third control block 206, the composite solution database 118 is searched and a paint color solution is determined as a function of the solution request.

Figure 3:
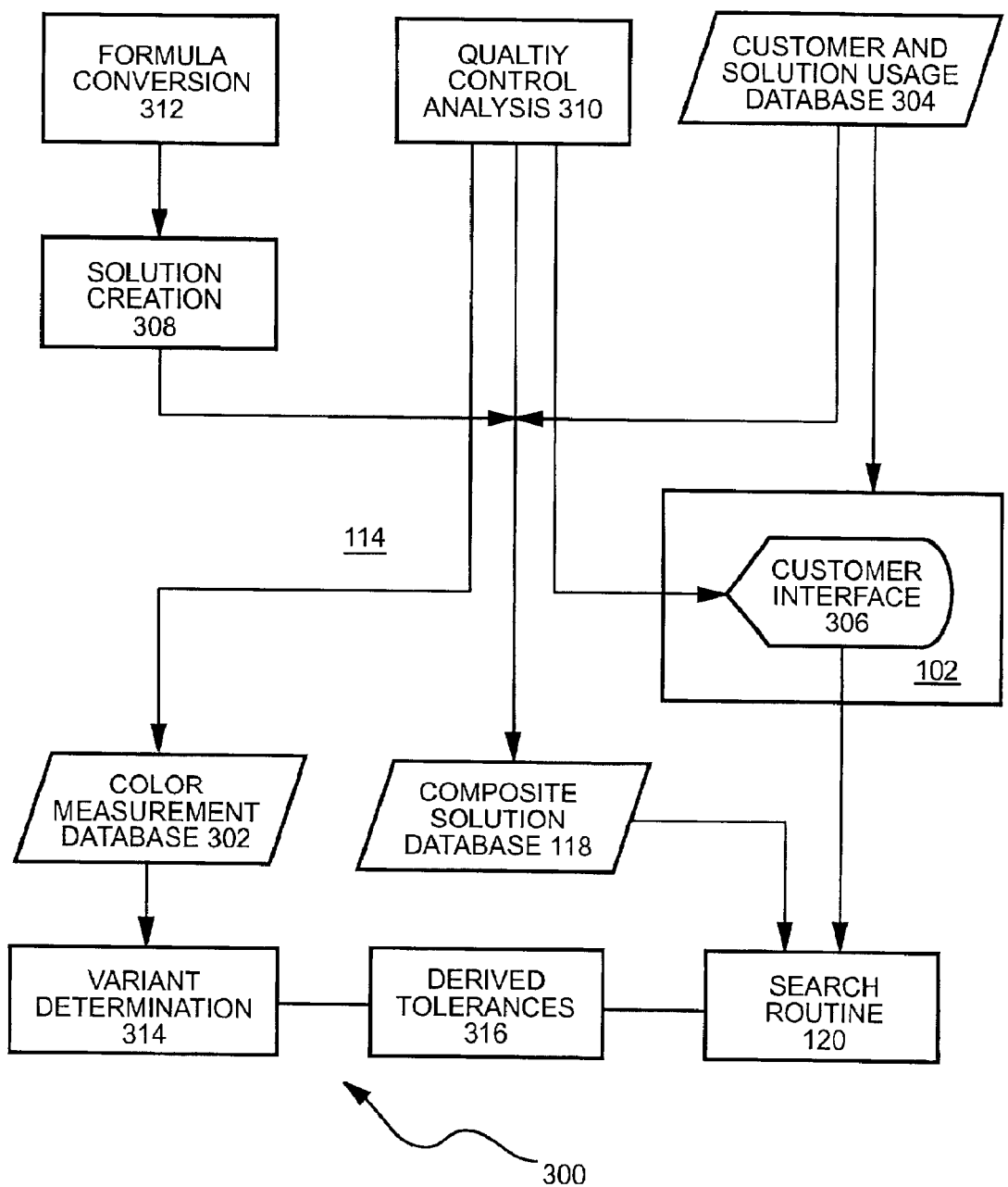
FIG. 3 is a block diagram of a color management and solution distribution system, according to another embodiment of the present invention; and, FIG. 4 is a flow diagram of a color management and solution distribution method, according to another embodiment of the present invention.

With particular reference to FIG. 3, in a second embodiment, a system 300 for managing and providing color solutions is provided. The system 300 includes three databases: the composite solution database 118, a color measurement database 302, and a customer and solution usage database 304.

A customer interface 306 is implemented on the first module 102 located at the remote location 104. The customer interface 306 allows the operator 106 to log on to the system, communicate with the system 100, 300, e.g., to request color solutions, and to receive color solutions from the system 100, 300. The customer interface 306 is graphical in nature, and, preferably, is accessed through a generic world wide web (WWW) browser, such as Microsoft™ Internet Explorer, available from Microsoft of Redmond, Wash.

The customer interface 306 may be implemented in hyper text markup language (HTML), the JAVA language, and may include JavaScript. The system 300 also includes several processes: a solution creation process 308, a quality control process 310, a formula conversion process 312, a variant determination process 314, and a derived tolerance process 316. Each of the databases 118, 302, 304 and the processes 308, 310, 312, 314, 316 will be explained further below.

Figure 4:
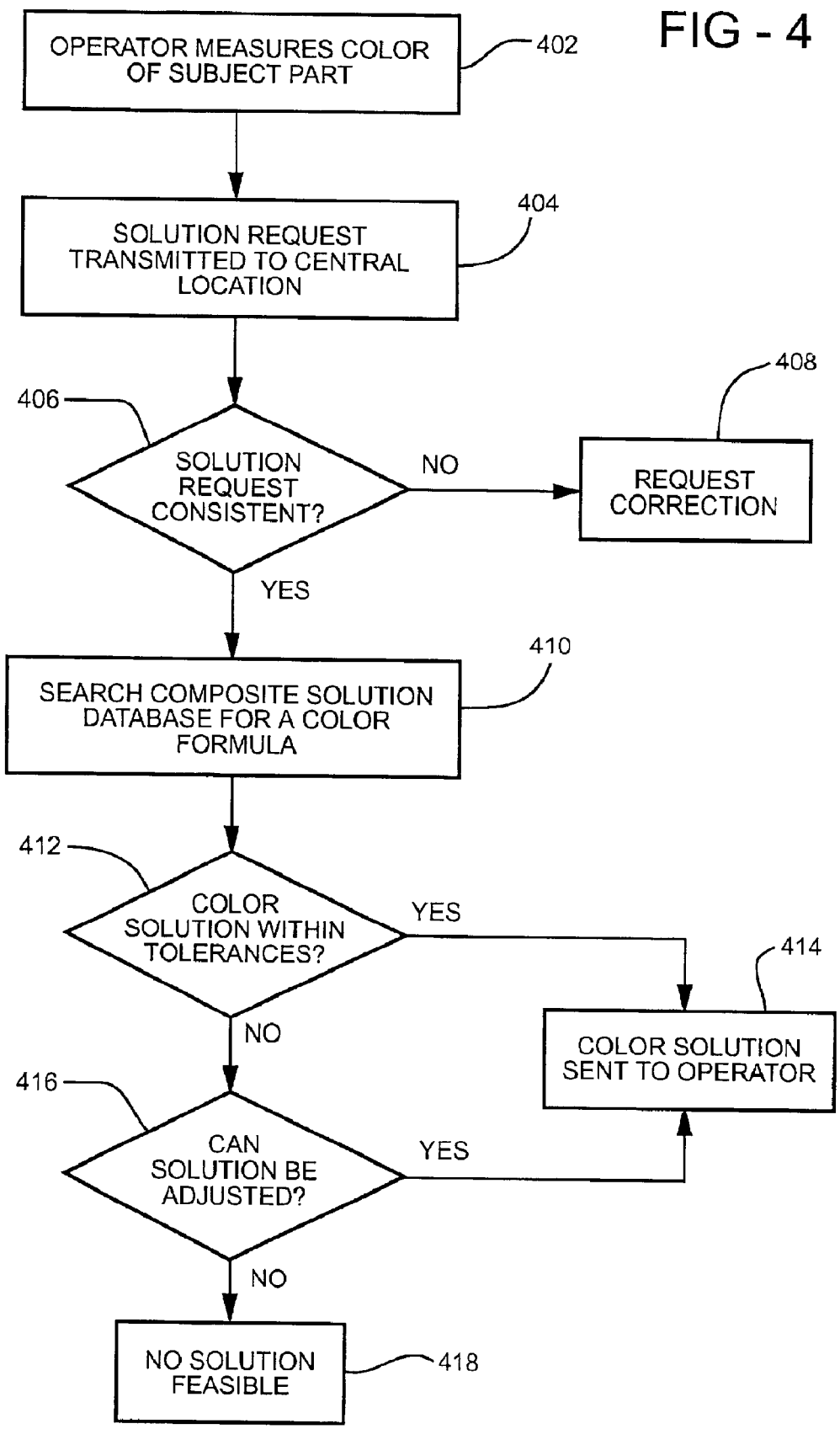

With reference to FIGS. 3 and 4, basic operation of the system 300 will now be discussed. In a fourth process block 402, the operator 106 measures the color of the part 108, using the color measuring device 110. As stated above, the color measuring device 110 may be a spectrophotometer, a digital camera or other suitable device. Preferably, the color measuring device 110 is a spectrophotometer which measures reflective values. The color measurements of the part 108 are taken at multiple angles using industry known methods.

In a fifth process block 404, the color measurement data along with other identifying data (collectively known as a solution request) are transmitted over the computer network 116 to the central location 114. The identifying data includes at least a color or paint code which represents the original color of the part 108. For example, in a system for color matching paint, the identifying data includes a customer identification number or identifier, vehicle information (make, model, model year), color code and desired paintline. Paintline refers to different types of paint available from the manufacturer, which typically balance product features and cost.

In a first decision block 406, the solution request is analyzed by the quality control analysis process 310 to ensure that the data contained in the solution request is accurate. For example, the quality control analysis process 310 compares the given color code with the color measurements to make sure that it is the right color. In the case of automotive paint matching, the color code and vehicle data are compared to make sure that the color was available on the particular model. Similar comparisons may be made for textile, plastic or other substrate with identifiable color tracking information. If the solution request is inconsistent, the inconsistencies are reported to the operator 106 in a sixth process block 408. The operator 106 is requested to make corrections through the customer interface 306.

Once the solution request has been approved by the quality control analysis process 310, control proceeds to a seventh process block 410. In the seventh process block 410, the search routine 120 searches the composite solution database 118 for a color solution (formulation) which most closely matches the solution request. The search routine 120 compares the color solution with tolerances determined by the derived tolerance process 316 (see below).

In a second decision block 410, if the color solution is within the tolerances, than the color solution is sent to the operator 106 at the remote location 104 in a eighth process block 414. If the color solution is not within the given tolerances, than control proceeds to a third decision block 416. In the third decision block 416, the solution creation process 308 attempts to adjust the solution to be within tolerances and/or creates a new solution. If the color solution can successfully adjust the solution or create a new solution, the new solution is sent to the operator 106. Otherwise, the operator 106 is informed that no solution is feasible in a ninth process block 418.

2. Databases

As discussed above, the system 100, 300 includes several databases containing information used in and generated by the various processes 120, 304, 306, 308, 310, 312, 314, 316. The use and content of each of these databases are described below.

A. Composite Solution Database 118

The composite solution database 118 is the main database of the system 100, 300 and contains all current formulations or variants for each color.

For example, the paint or color code "4M9" may have multiple formulations contained in the database 118. The composite solution database 118 is coupled to the search routine 120, the solution creation process 308, the quality control analysis process 310, and the customer and solution usage database 304.

For each formulation, the composite solution database 118 contains measurement data in the form of color values. Color values refer to color attributes used to quantify color. Examples include, but are not limited to, reflectance values, tristimulus values, and color space values. One example of color space values are defined by L*a*b*, where L* represents luminous intensity, a* represents a red/green appearance, b* represents a yellow/blue appearance. Another example of color space values are defined by L*, C*, h, where L* represents lightness, C* represents chroma, and h represents hue. The color values (L*, a*, and b* or L*, C*, and h) at various angles are obtained using a color measurement device.

B. Color Measurement Database 302

The color measurement database 302 includes all valid field measurements (color values) for a particular paint color (color code). Preferably, the color measurements included in the database 302 for a particular color code includes all measurements taken by inspectors and all valid measurements received by the system 100, 300 from customers. The color measurement data contained in the database 302 is used by the various processes 120, 308, 310, 312, 314, 316 of the system 100, 300.

C. Customer and Solution Usage Database

The customer and solution usage database 304 contains customer and solution request data gathered by the system 100, 300. For example, the customer and solution usage database may contain information regarding a particular customer, how many times the customer has used the system and what solutions he has requested. This data may be used to assist in planning for the future in terms of color trends and material requirements based on the requested color solutions.

3. Methods

A. Search Routine 120

As stated above, the search routine 120 is used to search the composite solution database 118 and determine a paint or other color solution as a function of the solution request. Given the color code or paint identifier (as part of the solution request), the corresponding formulations and associated color values are retrieved from the composite solution database 118.

Using tolerances received from the derived tolerances process 316 (see below), the formulations may be compared with the color measurements received from the operator 106 in the variant determination process 314 (see below). If a match is found, then the solution is sent to the operator 106 via the customer interface 306. If no match is found, then the solution creation process 308 (see below) attempts to derive a new formulation or adjust an existing formulation. If an acceptable solution is derived, then the derived solution is sent to the operator 106 via the customer interface 306. Otherwise, the operator 106 is informed that no solution exists.

B. Derived Tolerances Process 316

Acceptable tolerances vary depending on the color. Tolerances are expressed in differential color values, e.g., $\Delta L^*$, $\Delta C^*$, $\Delta H^*$. The differential values will vary as a function of the color. Historically, these values have been determined manually, i.e., by visual evaluation. The tolerances for that formulation are determined as a function of all of the color measurement values which have been deemed acceptable (usually by visible methods).

In the present invention, the derived tolerances process 316 is embodied in a neural network. The neural network is trained using the color values (L*, C*, h) for each formulation of each color and the differential color values from all acceptable measurements.

When a proposed color solution has been chosen by the search routine 120, the color values of the solution from the composite solution database 118 and the color measurement data taken from the subject part 108 form the input to the neural network. The output of the neural network is whether or not the color solution is acceptable. Preferably, the neural network is a feed-forward, back propagation neural network. One such neural network is disclosed in commonly assigned U.S. patent application Ser. No. 09/874,696 (BASF Docket: IN-5458; Attorney Docket No. 65,241-008), filed concurrently with the present application, which is hereby incorporated by reference.

C. Quality Control Analysis 310

As stated above, the quality control analysis process 310 ensures that the data contained in the solution request is accurate. In other words, the solution request is analyzed for inconsistencies.

D. Solution Creation Process 308

The solution creation process 308 attempts to either create a new solution given the customer's color measurement value or adjust an existing formulation contained in the composite solution database 118 using artificial intelligence methods. One such system is described in commonly assigned and pending U.S. patent applications Ser. Nos. 09/779,101 filed Feb. 7, 2001 (BASF Docket: IN-5393A) and 09/778,819 filed Feb. 7, 2001 (BASF Docket: IN-5393B), both of which are incorporated herein by reference.

E. Formula Conversion Process 312

The color formula conversion process 312 is utilized to convert color formulations between various paint, dye or colorant lines. Said process can be used to create needed solutions or starting points for the solution creation process 308. The formula conversion process 312 may be embodied in an artificial neural network.

One such process is disclosed in commonly assigned U.S. patent application Ser. No. 09/874,69 (BASF Docket: IN-5392; Attorney Docket No. 65,241-015), filed concurrently with the present application, which is hereby incorporated by reference.

F. Variant Determination Process 308

The variant determination process 308 may be used to select from the plurality of color solutions contained in the composite solution database 118 for a particular color code.

The measurements received from the customer do not necessarily need to go through the variant determination process before being delivered to the customer. The variant determination process is run after the customer's initial need is met, i.e., the customer receives a solution. The variant determination is a cluster analysis of the measurements. There are several reasons for performing this analysis including the following:

1) to determine if new solutions are needed;
2) decide what solutions should be published;
3) select targets for inclusion in color tools; and/or
4) trend analysis.

The variant determination process 308 compares the formulations with the color measurements of the part 108. Preferably, the variant determination process is accomplished using artificial intelligence techniques. In the preferred embodiment, the variant determination process includes a self-organizing map (SOM) neural network (not shown).

One such process is disclosed in commonly assigned U.S. patent application Ser. No. 09/874,697 (BASF Docket: IN-5459; Attorney Docket No. 65,241-009), filed concurrently with the present application, which is hereby incorporated by reference.

What is claimed is:

1. A computer system for providing a color solution to a customer, comprising:
   a color measurement device for taking a color measurement of a part to be repaired, the color measurement including color space values and reflectance values;
   a first module located at a remote location and being adapted to receive a solution request from an operator, the solution request including the color measurement; and,
   a second module coupled to the first module and being located at a central location, the second module including a composite solution database and a search routine coupled to the composite solution database and being adapted to receive the solution request from the first module, the search routine being adapted to search the composite solution database and determine the color solution as a function of the color space values and the reflectance values.

2. The computer system, as set forth in claim 1, wherein the first and second module are coupled by a computer network.

3. The computer system, as set forth in claim 1, wherein the first and second module are coupled via the internet.

4. The computer system, as set forth in claim 1, including a customer interface implemented on the first module.

5. The computer system, as set forth in claim 1, wherein the solution request includes a customer identifier.

6. The computer system, as set forth in claim 1, wherein the color measurement includes tristimulus values.

7. The computer system, as set forth in claim 1, wherein the color space values represent luminous intensity, red/green appearance, and yellow/blue appearance.

8. The computer system, as set forth in claim 1, wherein the color space values represent lightness, chroma, and hue.

9. The computer system, as set forth in claim 1, wherein the second control module being adapted to store the color measurement thereon.

10. The computer system, as set forth in claim 9, wherein the color measurement database includes color measurement data obtained by inspectors.

11. The computer system, as set forth in claim 1, wherein the composite solution database includes at least one formulation for a plurality of colors.

12. The computer system, as set forth in claim 11, wherein the composite solution database includes a color measurement associated with each formulation.

13. The computer system, as set forth in claim 12, wherein the solution request includes a color code and a color measurement of a part to be repaired, and wherein the color solution is determined as a function of the color code and the color measurement.

14. The computer system, as set forth in claim 1, wherein the second module includes means for deriving a new color solution as a function of the solution request if an acceptable solution is not found in the composite solution database.

15. The computer system, as set forth in claim 1, wherein the second module includes means for performing a consistency check on the solution request.

16. The computer system, as set forth in claim 1, wherein the second module includes means for determining and employing acceptable tolerances for the color solution.

17. The computer system, as set forth in claim 1, wherein the solution request includes vehicle information identifying a source of the part.

18. The computer system, as set forth in claim 1, wherein the solution request includes a desired paintline.

19. A computer system for providing a color solution to a customer, comprising:
   a first module located at a remote location and being adapted to receive a solution request from an operator at the customer, the solution request including a customer identifier; and,
   a second module coupled to the first module and being located at a central location, the second module including a composite solution database and a search routine coupled to the composite solution database and being adapted to receive the solution request from the first module, the search routine being adapted to search the composite solution database and determine the color solution as a function of the solution request, the second module including a customer and solution usage database, and being adapted to store customer information thereon, the customer information including the customer identifier and information about the customer's use of the system.

20. A computer system for providing a color solution to a customer, comprising:
   a color measurement device for taking a color measurement of a part to be repaired, the color measurement including color space values and reflectance values;
   a first module having a customer interface and being located at a remote location, the customer interface being adapted to receive a solution request from an operator, the solution request include the color measurement; and,
   a second module coupled to the first module and being located at a central location, the second module being adapted to receive the solution request, to perform a consistency check on the solution request and to responsively request clarification from the operator if the solution request is not consistent, the second module including a composite solution database and a search routine coupled to the composite solution database, the search routine being adapted to search the composite solution database and determine the color solution as a function of the color space values and the reflectance values.

21. The computer system, as set forth in claim 20, wherein the second module includes a customer and solution usage database, wherein the second module is adapted to store customer information thereon.

22. The computer system, as set forth in claim 20, wherein the second module includes a color measurement database, the second control module being adapted to store the color measurement thereon.

23. The computer system, as set forth in claim 20, wherein the second module includes means for deriving a new color solution as a function of the solution request if an acceptable solution is not found in the composite solution database.

24. The computer system, as set forth in claim 20, wherein the second module includes means for determining and employing acceptable tolerances for the color solution.

25. A computer based method for providing a color solution to a customer over a computer network, including the steps of:
   taking a color measurement of a part to be repaired by a color measurement device, the color measurement including color space values and reflectance values;
   receiving a solution request from an operator located at a remote location, the solution request including the color measurement;

delivering the solution request from the remote location to a central location over the computer network;

searching a composite solution database and determining the color solution as a function of the color space values and the reflectance values.

26. The computer based method, as set forth in claim 25, including the step of delivering the color solution to the operator at the remote location over the computer network.

27. The computer based method, as set forth in claim 25, including the step of providing a customer interface at the remote location.

28. The computer based method, as set forth in claim 25, wherein the color measurement includes tristimulus values.

29. The computer based method, as set forth in claim 25, wherein the color space values represent luminous intensity, red/green appearance, and yellow/blue appearance.

30. The computer based method, as set forth in claim 25, wherein the color space values represent lightness, chroma, and hue.

31. The computer based method, as set forth in claim 25 including the step of storing the color measurement in a color measurement database.

32. The computer based method, as set forth in claim 25, wherein the composite solution database includes at least one formulation for a plurality of colors.

33. The computer based method, as set forth in claim 32, wherein the composite solution database includes a color measurement associated with each formulation.

34. The computer based method, as set forth in claim 33, wherein the solution request includes a color code and a color measurement of a part to be repaired, and wherein the color solution is determined as a function of the color code and the color measurement.

35. The computer based method, as set forth in claim 25, including the step of deriving a new color solution as a function of the solution request if an acceptable solution is not found in the composite solution database.

36. The computer based method, as set forth in claim 25, including the step of performing a consistency check on the solution request.

37. The computer based method, as set forth in claim 25, including the step of determining and employing acceptable tolerances for the color solution.

38. A computer based method for providing a color solution to a customer over a computer network, including the steps of:

receiving a solution request from an operator located at a remote location, the solution request including a customer information including a customer identifier;

delivering the solution request from the remote location to a central location over the computer network;

searching a composite solution database and determining the color solution as a function of the solution request; and, storing customer information on a customer and solution usage database.

39. The computer based method, as set forth in claim 38, wherein the customer information includes information about the customer's use of the system.

40. The computer based method, as set forth in claim 38, wherein the customer information includes a number of times the system has been accessed by the customer.

\* \* \* \* \*